United States Patent [19]

Kawaguchi

[11] Patent Number: 5,697,211

[45] Date of Patent: Dec. 16, 1997

[54] EXHAUST GAS PURIFICATION DEVICE

[75] Inventor: Akio Kawaguchi, Susono, Japan

[73] Assignee: Toyota Jidosha Kabushiki Kaisha, Aichi, Japan

[21] Appl. No.: 574,708

[22] Filed: Dec. 19, 1995

[30] Foreign Application Priority Data

Dec. 21, 1994 [JP] Japan .................. 6-318116

[51] Int. Cl.⁶ .................................. F02G 1/055
[52] U.S. Cl. .............................. 60/39.512; 60/301
[58] Field of Search ................... 60/39.5, 39.512, 60/301, 277

[56] References Cited

U.S. PATENT DOCUMENTS

| | | | |
|---|---|---|---|
| 3,641,763 | 2/1972 | Cole | 60/39.51 |
| 3,797,231 | 3/1974 | McLean | 60/39.512 |
| 3,896,875 | 7/1975 | Bolger | 60/39.512 |
| 3,977,464 | 8/1976 | Mai | 60/39.512 |
| 5,237,939 | 8/1993 | Spokoyny et al. | 110/345 |
| 5,403,641 | 4/1995 | Katoh et al. | 60/277 |
| 5,404,719 | 4/1995 | Ataki et al. | 60/277 |

FOREIGN PATENT DOCUMENTS

| | | | |
|---|---|---|---|
| 0 102 473 | 12/1986 | European Pat. Off. | |
| 0 598 917 | 6/1994 | European Pat. Off. | |
| 2443362 | 4/1976 | Germany | 60/39.512 |
| 60-28234 | 2/1985 | Japan | |
| 2-256816 | 10/1990 | Japan | |
| 93/07363 | 4/1993 | Japan | |
| 6-108824 | 4/1994 | Japan | |
| 6-205935 | 7/1994 | Japan | |
| 6-317142 | 11/1994 | Japan | |
| 423318 | 10/1971 | U.S.S.R. | 60/39.512 |

OTHER PUBLICATIONS

Database WPI, Section Ch, Week 9124, 1991, Derwent Publications Ltd., London, GB, Class J01, AN 91-176270 & Su-A-1 581 356 (Cryogenic Equip RES), 30 Jul. 1990.

*Primary Examiner*—John T. Kwon
*Attorney, Agent, or Firm*—Kenyon & Kenyon

[57] ABSTRACT

An exhaust gas purification device comprising a rotary type heat accumulator rotated by a turbine. An $NO_x$ absorbent is carried on this heat accumulator. The exhaust gas discharged from the turbine circulates in the heat accumulator via an exhaust duct, and at this time, the heat accumulator is heated and, at the same time, $NO_x$ is absorbed into the $NO_x$ absorbent. Air discharged from the compressor is heated when circulating in the heat accumulator and is subsequently fed into the combustion vessel. When the fuel is supplied to the air to be fed into the heat accumulator and becomes a rich gaseous mixture, $NO_x$ is released from the $NO_x$ absorbent.

16 Claims, 11 Drawing Sheets

EXHAUST GAS PURIFICATION DEVICE

BACKGROUND OF THE INVENTION

1. Field of the Invention

The present invention relates to an exhaust gas purification device.

2. Description of the Related Art

Known in the art is a gas turbine in which a turbine and a compressor are driven by a combustion gas burned in a combustion vessel. The gas turbine is provided with a rotary heat accumulator driven to rotate by the turbine and alternately passing within an air circulation path to the combustion vessel and within an exhaust gas circulation path of the turbine. Heat is accumulated in the heat accumulator when the heat accumulator passes within the exhaust gas circulation path and, at the same time, air to be supplied to the combustion vessel is heated by the heat accumulated in the heat accumulator when the heat accumulator passes within the air circulation path (Japanese Unexamined Patent Publication (Kokai) No. 60-28234).

However, in such a gas turbine, there arises a problem of generation of a large amount of $NO_x$ since the fuel is usually burned under an excess of air.

SUMMARY OF THE INVENTION

An object of the present invention is to provide an exhaust gas purification device capable of preventing $NO_x$ from being discharged to the outside air.

According to the present invention, there is provided an exhaust gas purification device comprising a combustion chamber; a heat accumulator through which supply gas fed into the combustion chamber and exhaust gas discharged from the combustion chamber alternately flow, heat being accumulated in the heat accumulator when the exhaust gas flows within the heat accumulator, the supply gas being heated by the heat accumulation in the heat accumulator when the supply gas flows within the heat accumulator; an $NO_x$ absorbent carried on the heat accumulator, the $NO_x$ absorbent absorbing $NO_x$ when an air-fuel ratio of gas contacting the $NO_x$ absorbent is low and releasing an absorbed $NO_x$ when an air-fuel ratio of gas contacting the $NO_x$ absorbent is one of a rich air-fuel ratio and the stoichiometric air-fuel ratio, the $NO_x$ absorbent absorbing $NO_x$ contained in the exhaust gas when the exhaust gas flows within the heat accumulator; and means for making an air-fuel ratio of at least part of the supply gas, flowing within the heat accumulator, one of a rich air-fuel ratio and the stoichiometric air-fuel ratio to release $NO_x$ from the $NO_x$ absorbent when the supply gas of one of a rich air-fuel ratio and the stoichiometric air-fuel ratio flows within the heat accumulator.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

Figure 1:
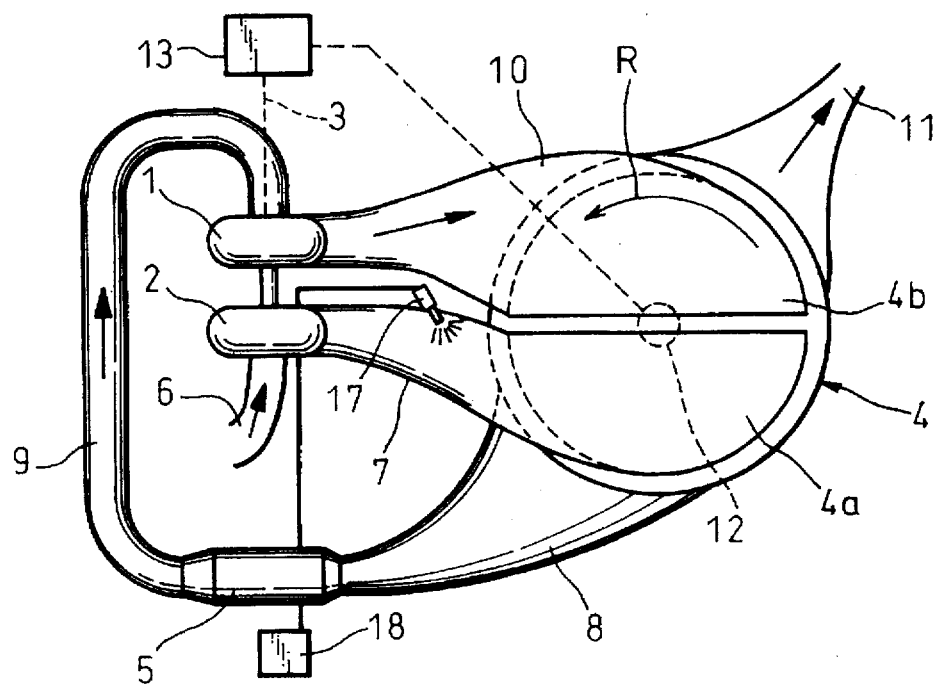
FIG. 1 is an overall view schematically showing a gas turbine.
Figure 2:
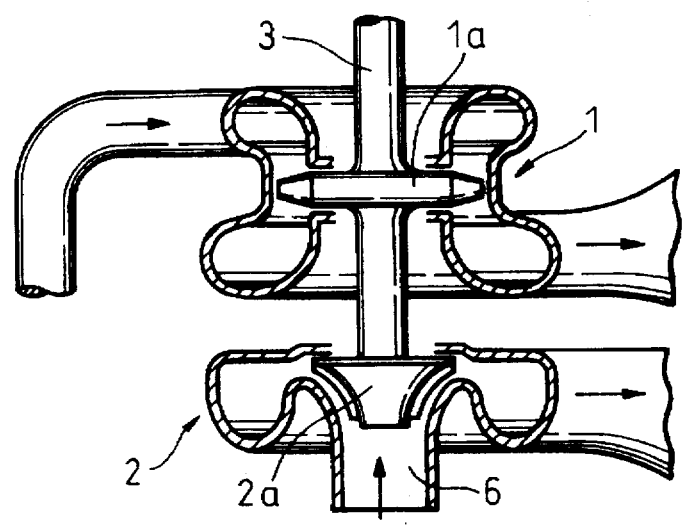
FIG. 2 is a plan cross-sectional view of a turbine and a compressor.
Figure 3A:
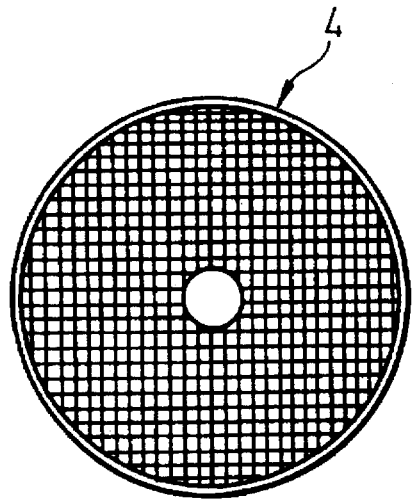
FIGS. 3A and 3B are views showing a rotary heat accumulator.
Figure 3B:
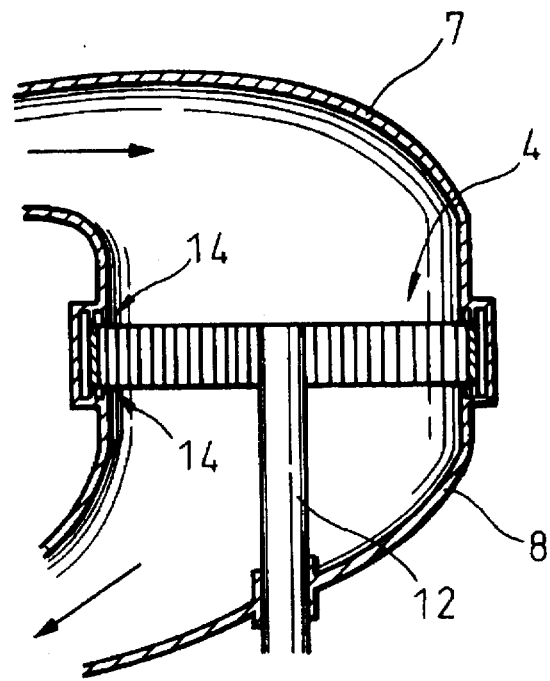
Figure 4:
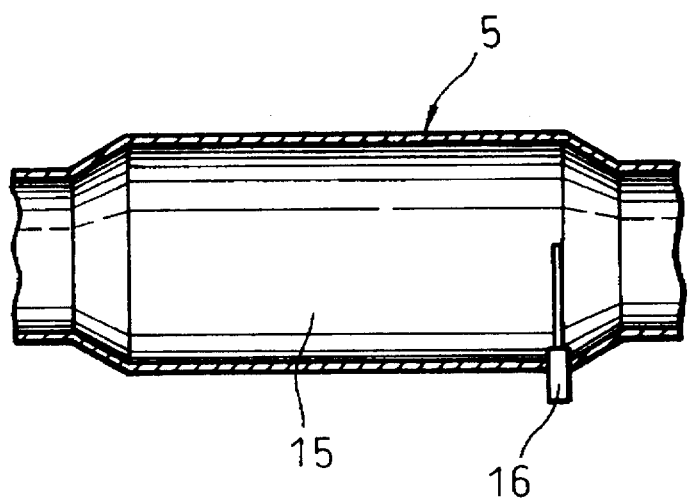
FIG. 4 is a side cross-sectional view of a combustion vessel.

FIG. 1 to FIG. 4 show a case where the present invention is applied to a gas turbine. Note that, in these FIG. 1 to FIG. 4, FIG. 1 shows a schematic view of an entire gas turbine and FIG. 2 to FIG. 4 show detailed views of portions of the gas turbine shown in FIG. 1.

Referring to FIG. 1 to FIG. 4, 1 denotes a turbine provided with a turbine wheel 1a; 2, a compressor provided with an impeller 2a driven to rotate by the turbine 1; 3, a turbine output shaft; 4, a rotary heat accumulator; and 5, a combustion vessel; respectively. The compressor 2 has an air intake port 6 for taking in outside air. An outlet side of the compressor 2 is guided to one side of the heat accumulator 4 via an intake duct 7. On the other hand, an intake duct 8 is extended from the other side of the heat accumulator 4 on the opposite side from the intake duct 7 toward the inlet side of the combustion vessel 5, and the outlet side of the combustion vessel 5 is connected to the inlet side of the turbine 1 via a combustion gas duct 9. The outlet side of the turbine 1 is guided to one side of the heat accumulator 4 via the exhaust duct 10, and the exhaust duct 11 is extended from the other side of the heat accumulator 4 opposite to the exhaust duct 10.

FIG. 3A is a plan view of the heat accumulator 4; and FIG. 3B is a side cross-sectional view of the heat accumulator 4. As shown in FIG. 3A and FIG. 3B, the heat accumulator 4 exhibits a disk-like shape and is formed by a ceramic. This heat accumulator 4 exhibiting the disk-like shape has a honeycomb construction having a large number of through holes extended in an axial direction. The heat accumulator 4 is supported by a rotation shaft 12 which is connected to a turbine output shaft 3 via a deceleration device 13 as shown in FIG. 1. Accordingly, this heat accumulator 4 is driven to rotate by the turbine output shaft 3 via the deceleration device 13, and at this time, the heat accumulator 4 is rotated in a direction indicated by an arrow R of FIG. 1 at a speed of for example about 20 revolutions to 30 revolutions per minute. Note that, the deceleration device 13 can be formed by a deceleration device which can control the deceleration ratio.

As shown in FIG. 1, the intake duct 7 and the exhaust duct 10 are arranged so as to cover almost the half regions 4a and 4b of an upper surface of the heat accumulator 4. Similarly, the intake duct 8 and the exhaust duct 11 are arranged so as to cover the lower surface regions of the heat accumulator 4 corresponding the exact backs of these regions 4a and 4b. As shown in FIG. 3B, the end surfaces of the intake ducts 7 and 8 facing the upper surface and lower surface of the heat accumulator 4 exhibit a mechanical seal construction 14 with respect to the upper surface and lower surface of the heat accumulator 4 over the whole circumference thereof, and although not indicated in the figure, also the end surfaces of the exhaust ducts 10 and 11 exhibit a mechanical seal construction with respect to the upper surface and lower surface of the heat accumulator 4 over the whole circumference thereof.

As shown in FIG. 4, the combustion vessel 5 forms a combustion chamber 15 at the inside thereof. In an inlet portion of the combustion chamber 15, a spark plug 16 is arranged. In the embodiment shown in FIG. 1 to FIG. 4, as shown in FIG. 1, a fuel injection nozzle 17 is arranged inside the intake duct 7. The amount of injection of fuel from this fuel injection nozzle 17 is controlled by the fuel supply control device 18.

When the turbine 1 is rotated, the air taken in from the air intake port 6 of the compressor 2 is raised in its pressure by the compressor 2 and discharged into the intake duct 7. Fuel is injected into this discharged air from the fuel injection nozzle 17. Subsequently, the air-fuel mixture containing this injected fuel, that is, the supply gas, passes within the heat accumulator 4 and is fed into the combustion chamber 15 of the combustion vessel 5 via the intake duct 8. The air-fuel mixture fed into the combustion chamber 15 is ignited by the spark plug 16, and the combustion gas burned in the combustion chamber 15 passes through the combustion gas duct 9 and is supplied to the turbine 1. This combustion gas is discharged into the exhaust duct 10 after giving a driving force to the turbine 1, and then passes in the heat accumulator 4 and is discharged into the atmosphere from the exhaust duct 11.

In this way, the exhaust gas discharged from the turbine 1 circulates in the heat accumulator 4. At this time, the heat accumulator 4 takes heat from the exhaust gas. This heat is accumulated in the heat accumulator 4. Subsequently, the heat accumulator 4 part accumulating the heat moves from the region 4b to the region 4a while rotating. When the heat accumulator 4 part accumulating the heat is positioned inside the region 4a, heat is given from the heat accumulator 4 to the supply gas circulating in the heat accumulator 4, and thus the supply gas to be supplied into the combustion vessel 5 is heated. As a result, this supply gas will be burned well inside the combustion chamber 15.

Usually, in the gas turbine, an air-fuel mixture leaner than the stoichiometric air-fuel ratio, that is, a lean air-fuel mixture, is burned in the combustion chamber 15. In this way, when the fuel is burned under an excess of air, $NO_x$ comes to be easily generated and there arises a problem in that this $NO_x$ is released into the atmosphere. Therefore, in the present invention, an $NO_x$ absorbent is carried on the heat accumulator 4 and the $NO_x$ is absorbed by this $NO_x$ absorbent, thereby to prevent $NO_x$ from being released into the atmosphere.

In the embodiment according to the present invention, the $NO_x$ absorbent is composed of at least one element selected from an alkali metal such as potassium K, sodium Na, lithium Li, or cesium Cs, an alkali earth such as barium Ba or calcium Ca, and a rare earth such as lanthanum La or yttrium Y and a precious metal such as platinum Pt. This $NO_x$ absorbent is carried on both surfaces of the heat accumulator 4 and the wall surfaces of the large number of through holes and internal portion. When the ratio of the air and fuel supplied upstream of the heat accumulator 4 carrying the $NO_x$ absorbent is referred to as an air-fuel ratio of the gas contacting the $NO_x$ absorbent, this $NO_x$ absorbent performs an absorbing and releasing action of $NO_x$, i.e., absorbing $NO_x$ when the air-fuel ratio of gas contacting the $NO_x$ absorbent is lean and releasing the absorbed $NO_x$ when the air-fuel ratio of gas contacting the $NO_x$ absorbent becomes rich or the stoichiometric air-fuel ratio.

Namely, when the ratio between the air and fuel supplied upstream from the exhaust duct 10, that is, the air-fuel ratio of the exhaust gas flowing into the heat accumulator 4, is lean, $NO_x$ in the exhaust gas will be absorbed into the $NO_x$ absorbent carried on the heat accumulator 4. On the other hand, when the air-fuel ratio of the supply gas flowing into the heat accumulator 4 is lean, where $NO_x$ is contained in this supply gas, $NO_x$ will be absorbed into the $NO_x$ absorbent carried on the heat accumulator 4, and when the air-fuel ratio of the supply gas flowing into the heat accumulator 4 becomes rich or the stoichiometric air-fuel ratio, $NO_x$ absorbed in the $NO_x$ absorbent will be released.

Figure 5A:
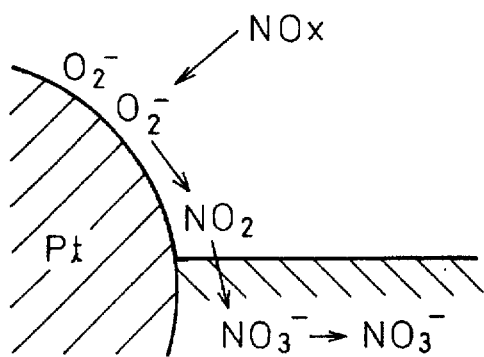
FIGS. 5A and 5B are views for explaining an absorbing and releasing action of $NO_x$.
Figure 5B:
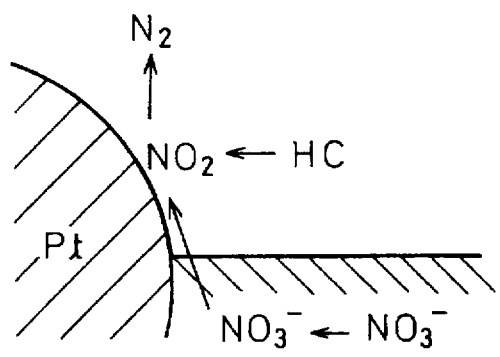

When the $NO_x$ absorbent is carried on the heat accumulator 4, as mentioned above, this $NO_x$ absorbent actually performs the absorbing and releasing action of $NO_x$, but there also exists some unclarity as to the detailed mechanism of this absorbing and releasing action. However, it can be considered that this absorbing and releasing action is carried out by a mechanism as shown in FIG. 5A and FIG. 5B. Next, an explanation will be made of this mechanism by taking as an example a case where the platinum Pt and barium Ba are carried on the carrier, but a similar mechanism is exhibited even if other precious metals, alkali metals, alkali earth, and rare earths are used.

Namely, as mentioned before, usually a lean air-fuel mixture is burned in the combustion chamber 15. Accordingly, the air-fuel ratio of the exhaust gas usually has become lean. At this time, a large amount of oxygen is contained in the exhaust gas. As shown in FIG. 5A, the oxygen $O_2$ is adhered to the surface of the platinum Pt in the form of $O_2^-$ or $O^{2-}$. On the other hand, at this time, NO in the exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is absorbed into the absorbent while being oxidized on the platinum Pt and is bonded with the barium oxide BaO, while being diffused into the absorbent in the form of a nitric acid ion $NO_3^-$ as shown in FIG. 5A. In this way, $NO_x$ is absorbed into the $NO_x$ absorbent. So far as the exhaust gas has a lean air-fuel ratio, $NO_2$ is produced on the surface of the platinum Pt, and so far as the $NO_x$ absorbing capability of the absorbent is not saturated, $NO_2$ is absorbed into the absorbent, and the nitric acid ion $NO_3^-$ is produced.

On the other hand, even when the supply gas which flows into the heat accumulator 4 has a lean air-fuel ratio, if $NO_x$ is contained in this supply gas, $NO_x$ is absorbed into the $NO_x$ absorbent by a similar mechanism. Contrary to this, when the air-fuel ratio of the supply gas is made rich or the stoichiometric air-fuel ratio, the hydrocarbons HC contained in the supply gas react with oxygen $O_2^-$ or $O^{2-}$ on the platinum Pt and are oxidized. As a result, oxygen no longer exists on the platinum Pt, and therefore the reaction is advanced in an inverse direction ($NO_3^- \rightarrow NO_2$), and thus the nitric acid ions $NO_3^-$ in the absorbent are released from the absorbent in the form of $NO_2$. This released $NO_2$ reacts with HC as shown in FIG. 5B and is reduced. In this way, when $NO_2$ no longer exists on the surface of the platinum Pt, $NO_2$ is successively released from the absorbent. Accordingly, if the air-fuel ratio of the supply gas is made rich or the stoichiometric air-fuel ratio, $NO_x$ absorbed in the $NO_x$ absorbent is released in a short time, and in addition this released $NO_x$ is reduced, and therefore it becomes possible to prevent $NO_x$ from being discharged into the atmosphere.

In the embodiment shown in FIG. 1 to FIG. 4, the supply gas flowing into the heat accumulator 4 is composed of an air-fuel mixture, and the overall supply gas to be supplied into the combustion vessel 5 is supplied into the combustion vessel 5 after passing through the heat accumulator 4. In this embodiment, usually, the air-fuel ratio of the air-fuel mixture has been made lean, and accordingly a lean gaseous mixture is burned in the combustion vessel 5. At this time, the $NO_x$ generated in the combustion vessel 5 is absorbed into the $NO_x$ absorbent when the exhaust gas circulates within the heat accumulator 4. On the other hand, since $NO_x$ is not contained in the air-fuel mixture flowing into the heat accumulator 4, an $NO_x$ absorbing action is not carried out in the region 4a.

On the other hand, the air-fuel ratio of the air-fuel mixture flowing into the heat accumulator 4 is periodically made rich or the stoichiometric air-fuel ratio in this embodiment. When the air-fuel ratio of the air-fuel mixture flowing into the heat accumulator 4 is made rich or the stoichiometric air-fuel ratio, in the region 4a, $NO_x$ absorbed in the $NO_x$ absorbent is released, and this released $NO_x$ is reduced. Accordingly, the $NO_x$ absorbing capability of the $NO_x$ absorbent is not saturated, and thus $NO_x$ contained in the exhaust gas is continuously absorbed by the $NO_x$ absorbent. On the other hand, this $NO_x$ absorbing material contains platinum Pt, and therefore also has a function as an oxidation catalyst, and accordingly unburnt HC and CO in the exhaust gas are oxidized by this $NO_x$ absorbent. Thus, it is possible to prevent $NO_x$ and unburnt HC and CO from being released into the atmosphere by the $NO_x$ absorbent.

Note that, as the amount of fuel injection from the fuel injection nozzle 17 is increased, the amount of $NO_x$ which is generated in the combustion chamber 15 is increased. Accordingly, it is also possible to estimate the amount of $NO_x$ to be generated in the combustion chamber 15 from the fuel injection amount, cumulatively add this estimated $NO_x$ amount during an operation period of the gas turbine, temporarily make the air-fuel ratio of the air-fuel mixture rich or the stoichiometric air-fuel ratio when this cumulative value exceeds a predetermined value, and make the $NO_x$ absorbent release $NO_x$. Moreover, it is also possible to control the deceleration ratio of the deceleration device 13 in accordance with the fuel injection amount and raise the rotation speed of the heat accumulator 4 as the fuel injection amount is increased. In this case, the control for making the air-fuel ratio of the air-fuel mixture rich is carried out every predetermined period. Note that, the control of the rotational speed of the heat accumulator 4 by the deceleration device 13 can be used also in any of the embodiments as will be explained below.

Figure 6:
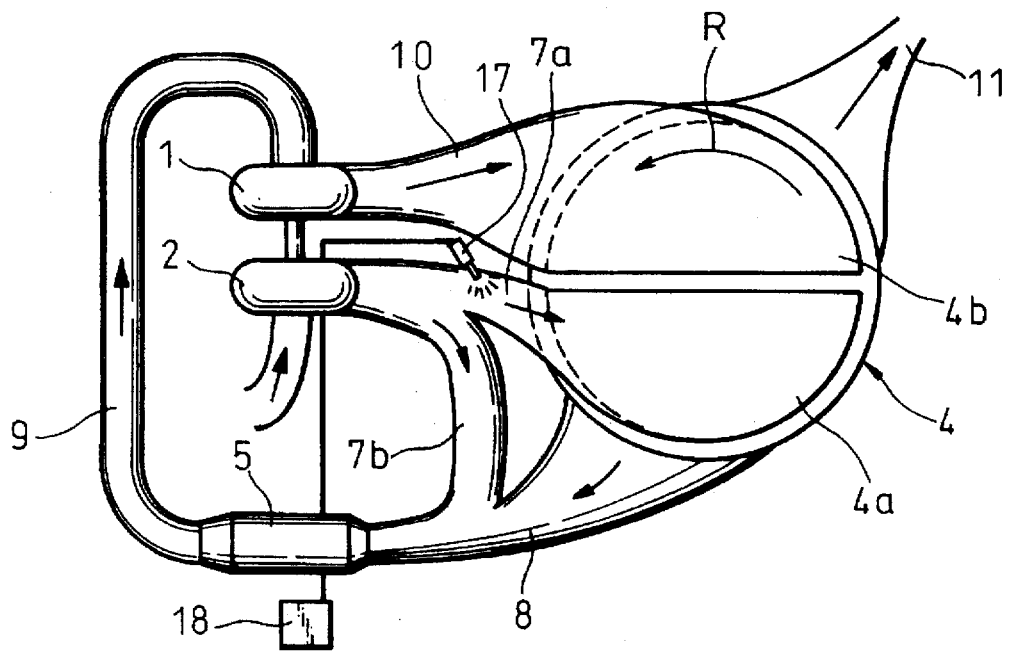
FIG. 6 is an overall view schematically showing another embodiment of the gas turbine.

FIG. 6 shows another embodiment. In this embodiment, the intake duct 7 is divided into a first intake duct 7a and a second intake duct 7b. The first intake duct 7a is guided to the region 4a of the heat accumulator 4, and the fuel injection nozzle 17 is arranged in this first intake duct 7a. Contrary to this, the second intake duct 7b is connected to the intake duct 8 without passing through the heat accumulator 4. Accordingly, in this embodiment, a part of the supply gas in the supply gas to be supplied to the combustion vessel 5 is made to circulate in the heat accumulator 4.

As seen from FIG. 6, in this embodiment, the supply gas to be supplied from the first intake duct 7a to the heat accumulator 4 is made an air-fuel mixture, and air is supplied from the second intake duct 7b to the intake duct 8. Further, in this embodiment, the injection of the fuel injection nozzle 17 is controlled so that the air-fuel ratio of the gaseous mixture to be supplied into the combustion chamber 5 becomes lean, and the air-fuel ratio of the gaseous mixture flowing from the first intake passageway 7a into the heat accumulator 4 becomes rich or the stoichiometric air-fuel ratio. Note that, in the embodiment shown in FIG. 6, the air-fuel ratio of the gaseous mixture flowing from the first intake passageway 7a into the heat accumulator 4 is always made rich or the stoichiometric air-fuel ratio, but it is also possible to usually control the air-fuel ratio of this gaseous mixture to lean and periodically make the air-fuel ratio of this gaseous mixture rich or the stoichiometric air-fuel ratio.

Figure 7:
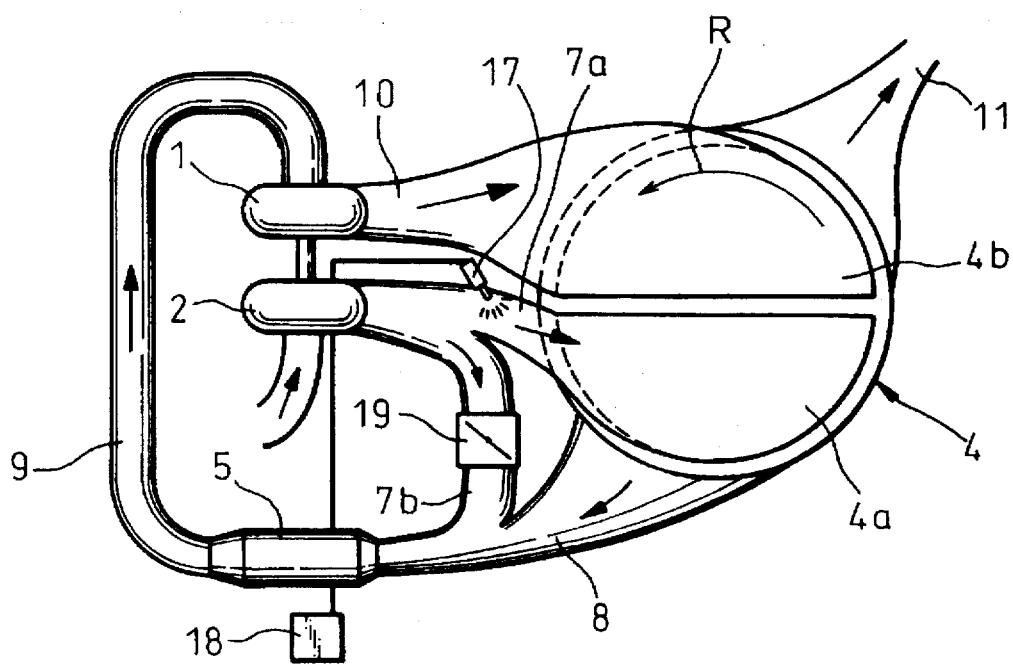
FIG. 7 is an overall view schematically showing still another embodiment of the gas turbine.
Figure 8A:
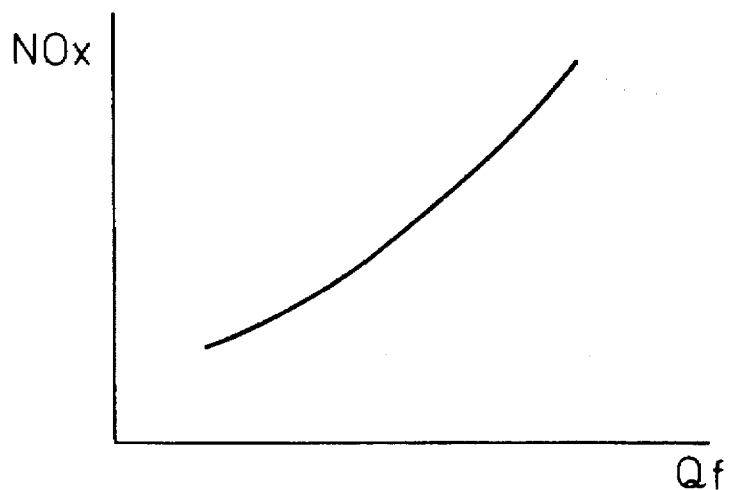
FIGS. 8A and 8B are graphs showing a control valve opening degree etc.
Figure 8B:
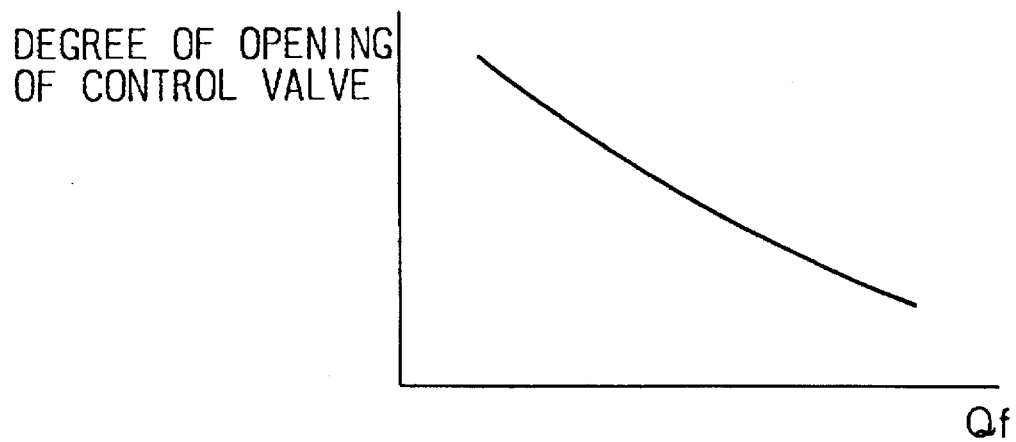

FIG. 7 shows still another embodiment. Also in this embodiment, the intake duct 7 is divided into a first intake duct 7a and a second intake duct 7b, but in this embodiment, unlike the embodiment shown in FIG. 6, the air control valve 19 is arranged in the second intake duct 7b. In this embodiment, as the $NO_x$ absorption of the $NO_x$ absorbent in the region 4b is increased, the air control valve 19 is opened more, and the amount of the air-fuel mixture which flows from the first intake duct 7a into the heat accumulator 4 is increased. Namely, as shown in FIG. 8A, along with an increase of the fuel injection amount Qf, the amount of $NO_x$ which is generated in the combustion chamber 15 is increased, and thus, as shown in FIG. 8B, as the fuel injection amount Qf is increased, the opening degree of the air control valve 19 is decreased. In this embodiment, as the amount of $NO_x$ which is absorbed into the $NO_x$ absorbent is increased, the amount of the gaseous mixture having a rich or stoichiometric air-fuel ratio circulating in the heat accumulator 4 is increased, and therefore even if $NO_x$ absorbed in the $NO_x$ absorbent is increased, a risk of saturation of the $NO_x$ absorbing capability of the $NO_x$ is eliminated.

Figure 9:
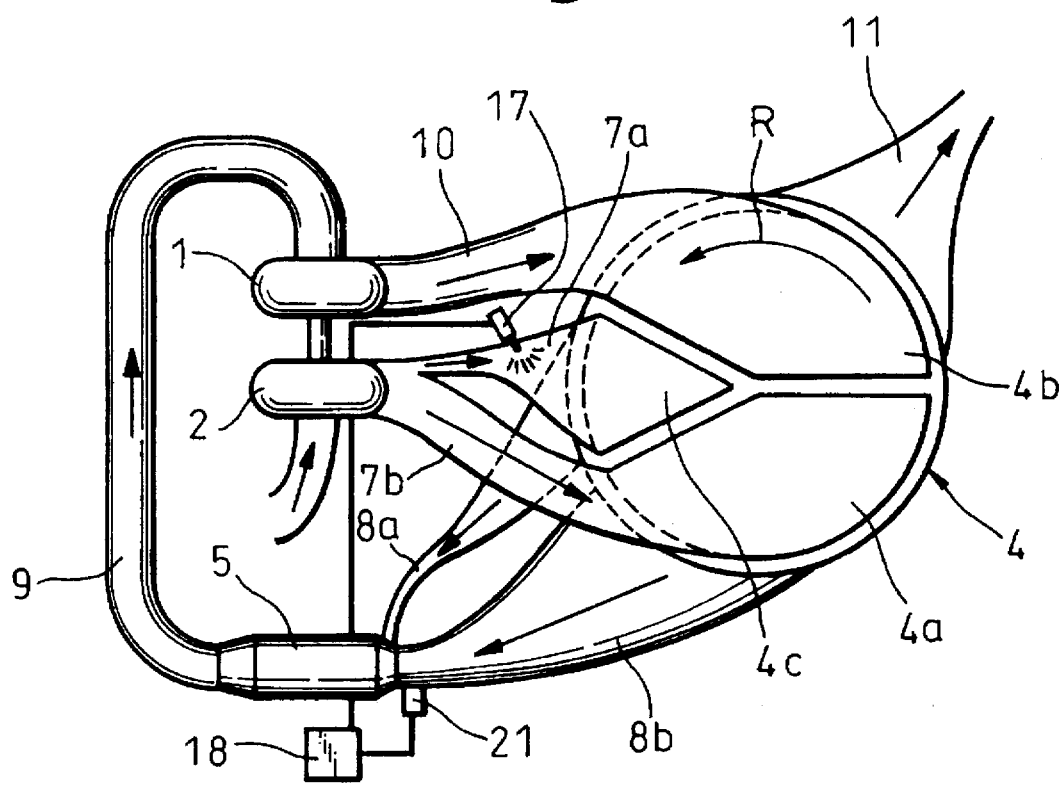
FIG. 9 is an overall view schematically showing a further embodiment of the gas turbine.
Figure 10:
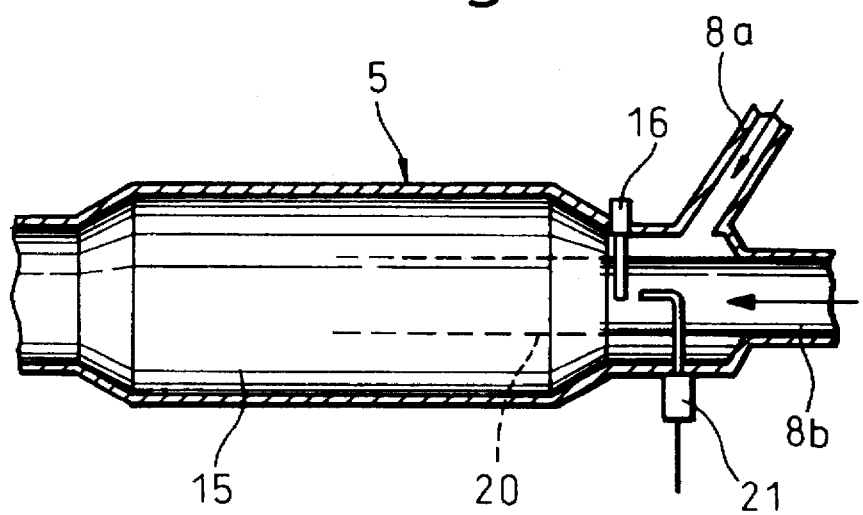
FIG. 10 is a side cross-sectional view of the combustion vessel shown in FIG. 9.

FIG. 9 and FIG. 10 show a further embodiment. As shown in FIG. 9, also in this embodiment, the intake duct 7 is divided into a first intake duct 7a and a second intake duct 7b, and the fuel injection nozzle 17 is arranged in the first intake duct 7a. Also in this embodiment, the gas circulation region of the heat accumulator 4 is divided into the regions 4a and 4b and a region 4c having a smaller surface area than that of these regions 4a and 4b. Further, the intake duct 8 is divided into a first intake duct 8a and a second intake duct 8b, the first intake duct 7a is connected to the first intake duct 8a via the region 4c, and the second intake duct 7b is connected to the second intake duct 8b via the region 4a.

Further, in this embodiment, as shown in FIG. 10, a hollow cylindrical body 20 having a large number of apertures formed therein is arranged in the combustion vessel 5. An end portion of the hollow cylindrical body 20 is connected to the second intake duct 8b, and an annular space around the hollow cylindrical body 20 is connected to the first intake duct 8a. Also, the main fuel injection nozzle 21 is arranged in the hollow cylindrical body 20.

In this embodiment, the air flowing from the second intake duct 7b into the region 4a of the heat accumulator 4 is heated by the heat accumulator 4 and then passes through the second intake duct 8b and supplied into the combustion chamber 15. Into this air, fuel is injected from the main fuel injection nozzle 21. On the other hand, the air-fuel mixture of the rich or stoichiometric air-fuel ratio flows from the first intake duct 7a into the region 4c of the heat accumulator 4. From the $NO_x$ absorbent in the region 4c, $NO_x$ is released by this air-fuel mixture of a rich or stoichiometric air-fuel ratio, and this released $NO_x$ is immediately reduced. Subsequently, the gaseous mixture circulated in the region 4c is supplied into the combustion chamber 15 via the first intake duct 8a and burned. Also in this case, the mean air-fuel ratio of the gaseous mixture which is burned in the combustion chamber 15 has become lean.

Note that, also in this embodiment, the air-fuel mixture of the rich or stoichiometric air-fuel ratio continuously flows into the region 4c, but usually it is also possible to stop the fuel injection from the fuel injection nozzle 17 and supply an air-fuel mixture of a rich or stoichiometric air-fuel ratio into the region 4c for a period when the heat accumulator 4 periodically rotates one time.

Figure 11:
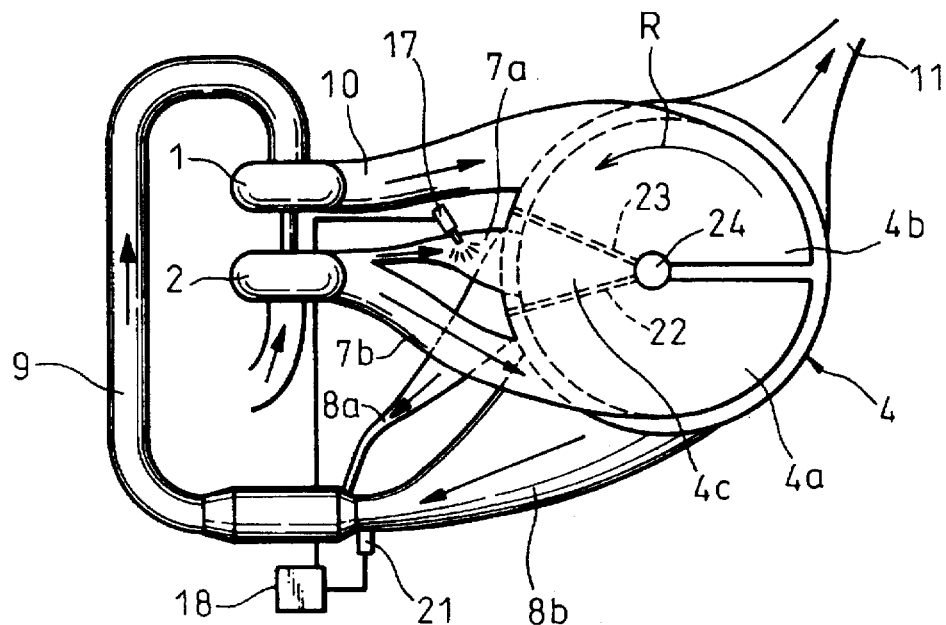
FIG. 11 is an overall view schematically showing still another embodiment of the gas turbine.

FIG. 11 shows another embodiment. Also in this embodiment, the intake duct 7 is divided into the first intake duct 7a and the second intake duct 7b, the intake duct 8 is divided into the first intake duct 8a and the second intake duct 8b, and the fuel injection nozzle 17 is arranged in the first intake duct 7a. Further, in this embodiment, a movable isolation wall 22 isolating the region 4a and the region 4c and a movable isolation wall 23 isolating the region 4b and the region 4c are arranged so that they can revolve by the revolution device 24 around the center axis of the heat accumulator 4. Namely, in this embodiment, by revolving a pair of movable isolation walls 22 and 23, the surface area of the region 4c of the heat accumulator 4 in which the air-fuel mixture of the rich or stoichiometric air-fuel ratio circulates can be controlled.

Figure 13:
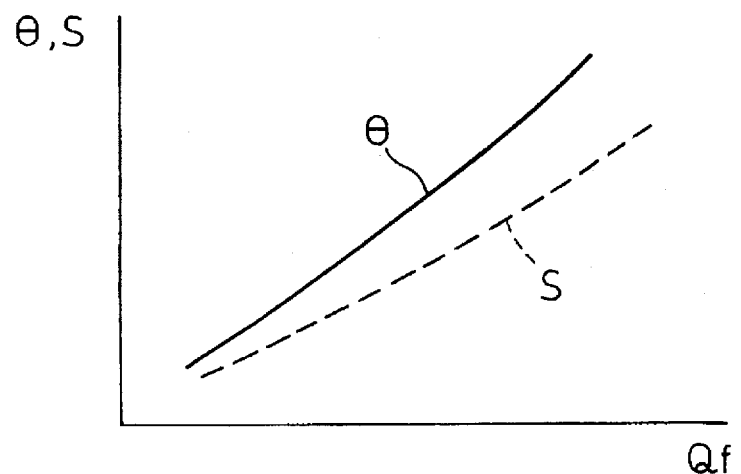
FIG. 13 is a graph showing the control valve opening degree etc.

As mentioned before, when the fuel injection amount is increased, the amount of generation of $NO_x$ is increased along with this, and accordingly also the amount of $NO_x$ to be absorbed into the $NO_x$ absorbent is increased. Accordingly, so as to release $NO_x$ from the $NO_x$ absorbent well, in the embodiment shown in FIG. 11, for example, as indicated by a broken line S of FIG. 13, as the fuel injection amount Qf is increased, the surface area S of the region 4c is increased.

Figure 12:
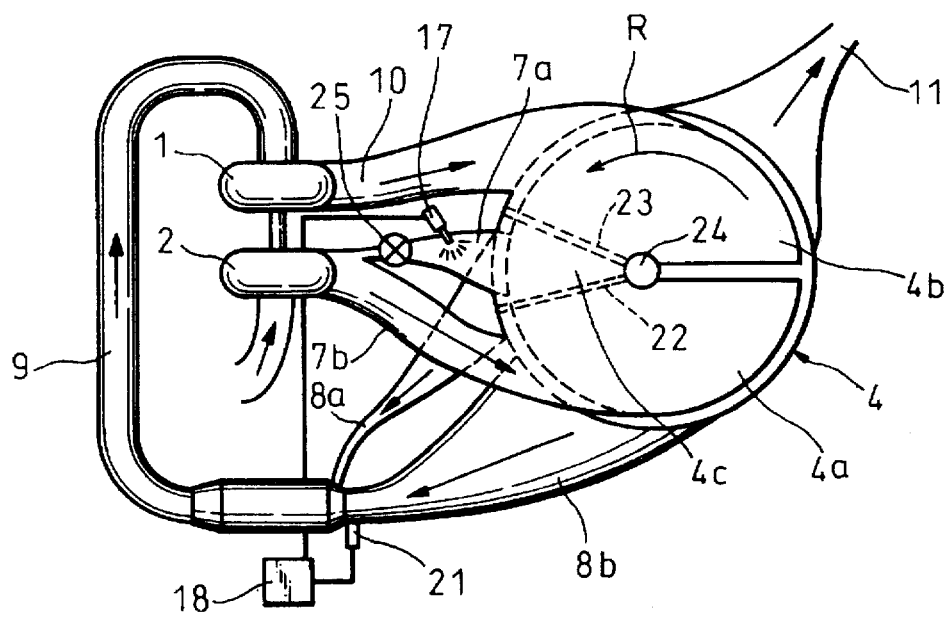
FIG. 12 is an overall view schematically showing still another embodiment of the gas turbine.

FIG. 12 shows still another embodiment. This embodiment basically has a similar construction to that of the embodiment shown in FIG. 11, but in the embodiment shown in FIG. 12, an air control valve 25 is arranged in the first intake duct 7a. In this embodiment, when the surface area S of the region 4c is changed, so as not to change the amount of circulating air-fuel mixture having a rich or stoichiometric air-fuel ratio per the unit surface area in the heat accumulator 4, as indicated by a solid line θ in FIG. 13, as the fuel injection amount Qf is increased, the opening degree θ of the air control valve 25 is increased.

Figure 14:
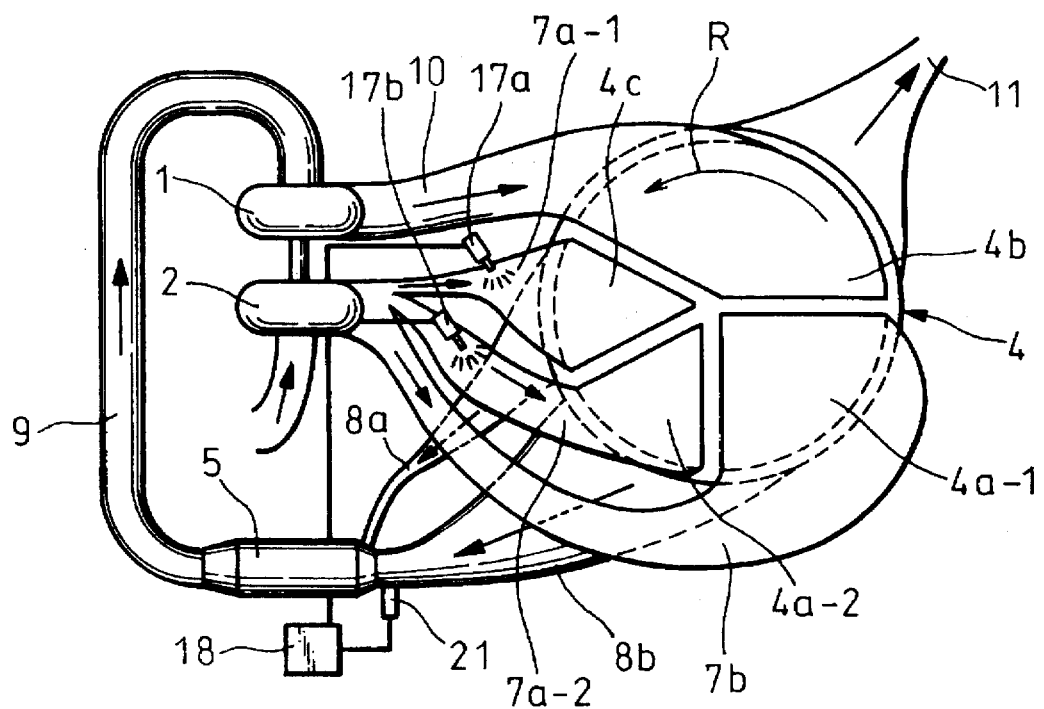
FIG. 14 is an overall view schematically showing still another embodiment of the gas turbine.

FIG. 14 shows still another embodiment. In this embodiment, the gas circulation region of the heat accumulator 4 is divided into four regions of an air circulation region 4a-1, a circulation region 4b of exhaust gas, a circulation region 4a-2 of air or the air-fuel mixture, and a circulation region 4c of the air-fuel mixture of a rich or stoichiometric air-fuel ratio. On the other hand, the intake duct 7 is divided into a first intake duct 7a-1, second intake duct 7a-2, and a third intake duct 7b, and fuel injection nozzles 17a and 17b are arranged in the first intake duct 7a-1 and the second intake duct 7a-2, respectively. Also, the first intake duct 7a-1 is connected to the first intake duct 8a via the region 4c, and the second intake duct 7a-2 and the third intake duct 7b are together connected to the second intake duct 8b via the corresponding region 4a-2 and region 4a-1, respectively.

In this embodiment, when the operation state in which the fuel injection amount is small is continued, that is, in an operation state where the amount of $NO_x$ which is absorbed into the $NO_x$ absorbent per unit time is small, the fuel injection from the fuel injection nozzle 17a is carried out, and the fuel injection from the fuel injection nozzle 17b is stopped. At this time, into the region 4c, the air-fuel mixture of the rich or stoichiometric air-fuel ratio flows, and the releasing action of $NO_x$ is carried out, and the air is supplied to the region 4a-2 and the region 4a-1. Contrary to this, when an operation state where the amount of the fuel injection is large is continued, that is, in the operation state where the amount of $NO_x$ which is absorbed into the $NO_x$ absorbent per unit time is large, the fuel injection is carried from both of the fuel injection nozzles 17a and 17b. At this time, into the region 4c and region 4a-2, the air-fuel mixture of a rich or stoichiometric air-fuel ratio flows, so that the releasing action of $NO_x$ is carried out, and the air is supplied to the region 4a-1.

Moreover, it is also possible to perform another control by using the gas turbine having a construction shown in FIG. 14. Namely, it is also possible to make the air-fuel mixture of a rich or stoichiometric air-fuel ratio flow into the region 4c and make a lean air-fuel mixture flow into the region 4a-2. In this case, in the region 4c, the releasing action of $NO_x$ is carried out, and in the region 4c, the unburnt HC remaining in the heat accumulator 4 at the time of releasing of $NO_x$ is burned in the region 4a-2. Accordingly, in this case, the discharge amount of the unburnt HC can be reduced.

Figure 15:
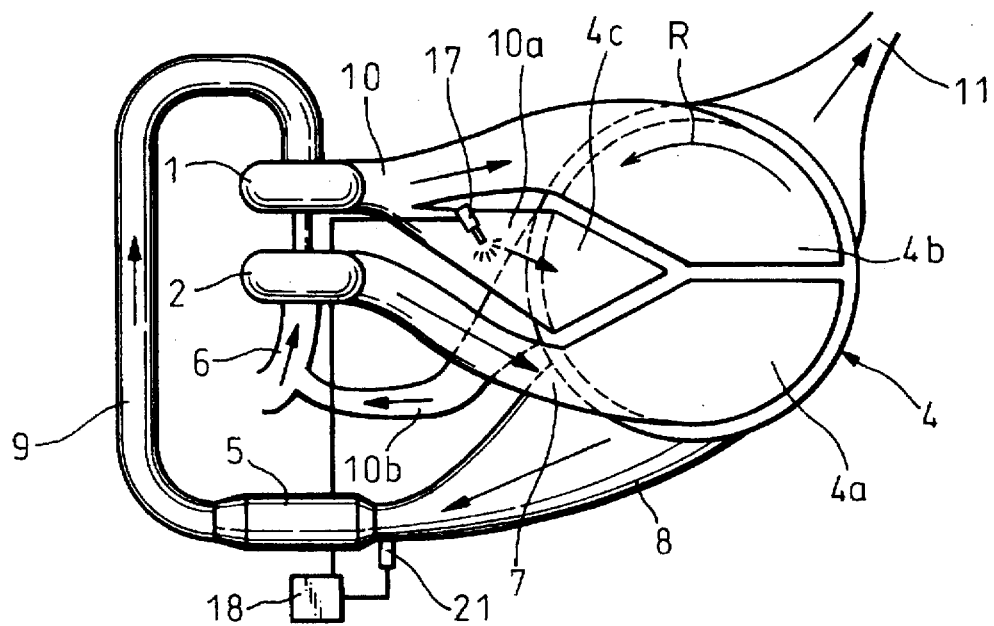
FIG. 15 is an overall view schematically showing still another embodiment of the gas turbine.

FIG. 15 shows still another embodiment. In this embodiment, the $NO_x$ releasing duct 10a is branched from the exhaust duct 10, and the fuel injection nozzle 17 is arranged in this $NO_x$ releasing duct 10a. This $NO_x$ releasing duct 10a is guided to the region 4c of the heat accumulator 4 and connected to the air intake port 6 of the compressor 2 via this region 4c and duct 10b. The pressure in the air intake port 6 of the compressor 2 is lower than the pressure in the exhaust duct 10, and accordingly the exhaust gas in the exhaust duct 10 flows into the region 4c via the $NO_x$ releasing duct 10a.

Fuel is injected into the $NO_x$ releasing duct 10a from the fuel injection nozzle 17. As a result, an exhaust gas having a ratio between the air and fuel supplied upstream of the region 4c, that is, the air-fuel ratio which is rich or the stoichiometric air-fuel ratio, flows into the region 4c. Thus, in the region 4c, the $NO_x$ releasing action from the $NO_x$ absorbent will be carried out. Subsequently, this exhaust gas passes through the duct 10b and is fed into the air intake port 6 and mixed with air flowing from an external portion. This gaseous mixture of air and exhaust gas passes through the compressor 2 and is fed into the intake duct 7 and subsequently passes in the region 4a and then is fed into the combustion vessel 5 via the intake duct 8.

In this embodiment, fuel is injected into a high temperature exhaust gas, and therefore the vaporization of the fuel is promoted, and thus the injected fuel is uniformly diffused in the region 4c. Also, in the region 4c, the temperature of the heat accumulator 4 is almost never lowered. As a result, $NO_x$ will be released well from the $NO_x$ absorbent. Also, by re-circulating the exhaust gas in the combustion chamber 15 in this way, the amount of generation of $NO_x$ can be reduced.

Figure 16:
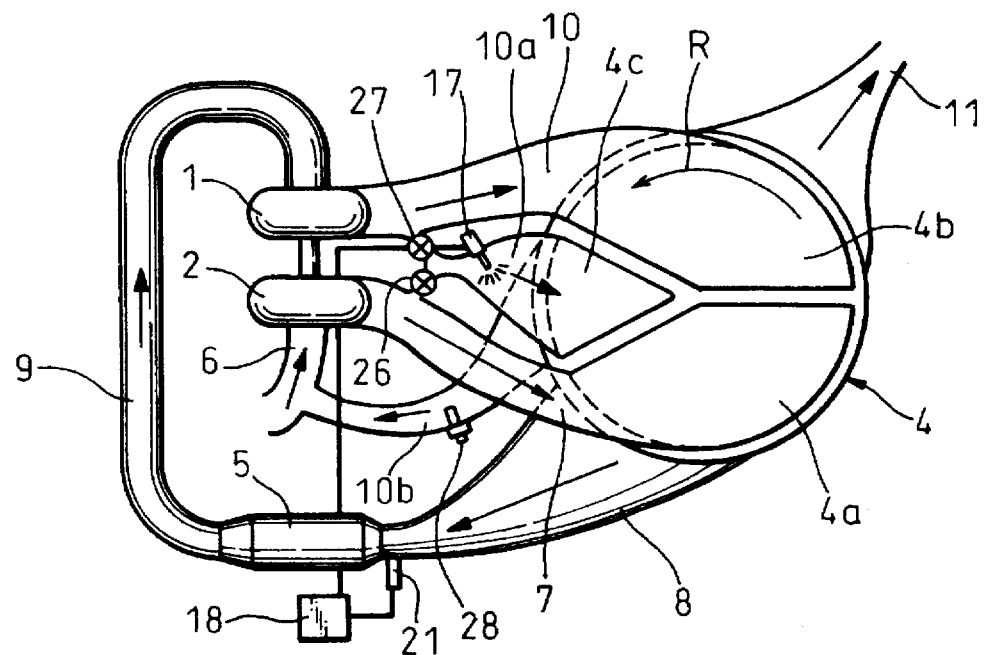
FIG. 16 is an overall view schematically showing still another embodiment of the gas turbine.

FIG. 16 shows still another embodiment. In this embodiment, the $NO_x$ releasing duct 10a is branched from the intake duct 7 and the exhaust duct 10, and the fuel injection nozzle 17 is arranged in this $NO_x$ releasing duct 10a. This $NO_x$ releasing duct 10a is guided to the region 4c of the heat accumulator 4 and connected to the air intake port 6 of the compressor 2 via this region 4c and duct 10b. The air control valve 26 is arranged between the intake duct 7 and the $NO_x$ releasing duct 10a, and an exhaust gas control valve 27 is arranged between the exhaust duct 10 and the $NO_x$ releasing duct 10a. The pressure inside the air intake port 6 of the compressor 2 is lower than the pressure inside the intake duct 7 and the pressure inside the exhaust duct 10, and accordingly, when the respective control valves 26 and 27 open, the air and exhaust gas flow into the region 4c via the $NO_x$ releasing duct 10a.

Into the $NO_x$ releasing duct 10a, fuel is injected from the fuel injection nozzle 17, and as a result, a gaseous mixture of exhaust gas and air having a ratio between the air and fuel supplied upstream of the region 4c, that is, an air-fuel ratio which is rich or the stoichiometric air-fuel ratio, flows into the region 4c. Thus, in the region 4c, the $NO_x$ releasing action from the $NO_x$ absorbent will be carried out. Subsequently, this gaseous mixture passes through the duct 10b and is fed into the air intake port 6 and mixed with the air flowing from the external portion. This gaseous mixture passes through the compressor 2 and is fed into the intake duct 7 and subsequently passes in the region 4a and then is fed into the combustion vessel 5 via the intake duct 8.

Note that, in this embodiment, the opening degrees of the control valves 26 and 27 are controlled so that the temperature of the region 4c becomes a temperature such that $NO_x$ is easily released. In this case, as shown in FIG. 16, it is also possible to arrange a temperature sensor 28 in the duct 10b and control the opening degrees of the control valves 26 and 27 so that the temperature of the gas passed through the region 4c detected by this temperature sensor 28 becomes the predetermined temperature.

Figure 17:
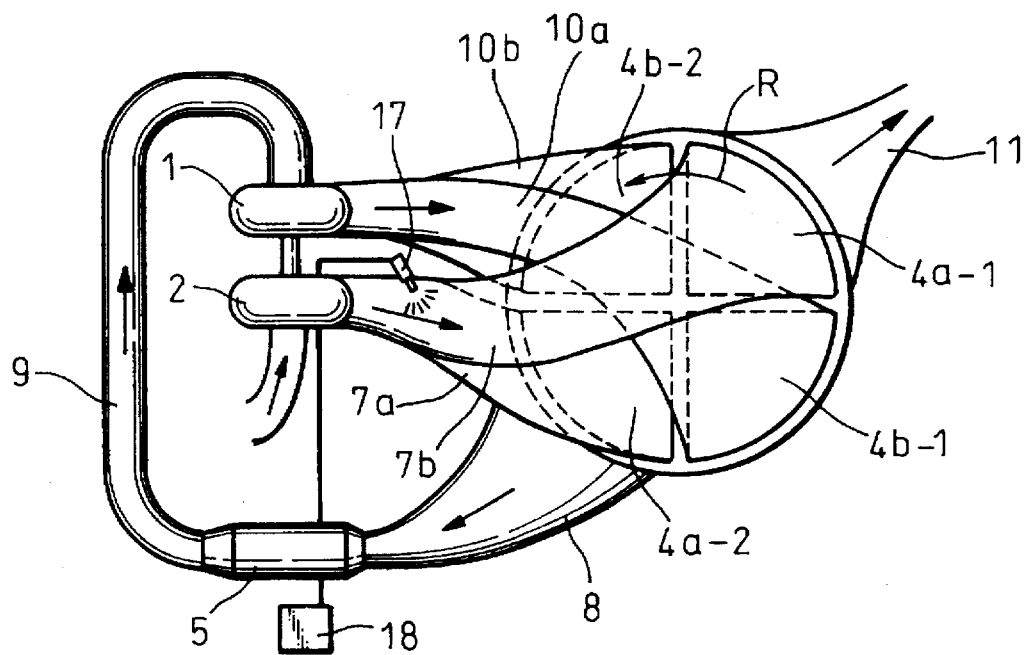
FIG. 17 is an overall view schematically showing still another embodiment of the gas turbine.

FIG. 17 shows still another embodiment. In this embodiment, the intake duct 7 is branched into the intake ducts 7a and 7b, and the respective intake ducts 7a and 7b are connected to the intake duct 8 via the corresponding regions 4a-1 and 4a-2 of the heat accumulator 4. Also, in this embodiment, the exhaust duct 10 is branched into a plurality of exhaust ducts 10a and 10b, and the respective exhaust ducts 10a and 10b are connected to the exhaust duct 11 via the corresponding regions 4b-1 and 4b-2 of the heat accumulator 4. Further, in this embodiment, the regions 4a-1 and 4a-2 through which the supply gas to the combustion vessel 5 circulates and the regions 4b-1 and 4b-2 through which the exhaust gas circulates are alternately arranged in the rotation direction of the heat accumulator 4.

The amount of $NO_x$ to be absorbed into the $NO_x$ is proportional to a time for which the $NO_x$ absorbent is exposed to the exhaust gas. Accordingly, as shown in FIG. 7, where the respective exhaust gas circulation regions 4b-1 and 4b-2 are made narrower, a time for which these regions are exposed to the exhaust gas becomes shorter, and therefore a margin is produced in the absorption amount of $NO_x$, and thus it becomes possible to make the rotation speed of the heat accumulator 4 slow. Namely, in the embodiment shown in FIG. 17, the rotation drive loss of the heat accumulator 4 can be lowered.

Figure 18:
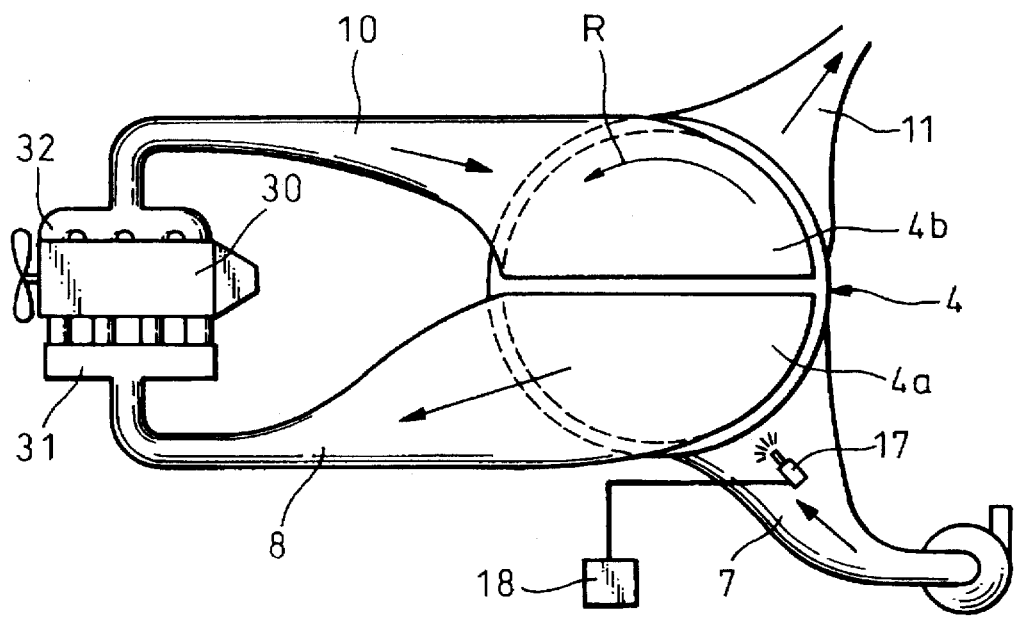
FIG. 18 is an overall view schematically showing a reciprocating type internal combustion engine.
Figure 19:
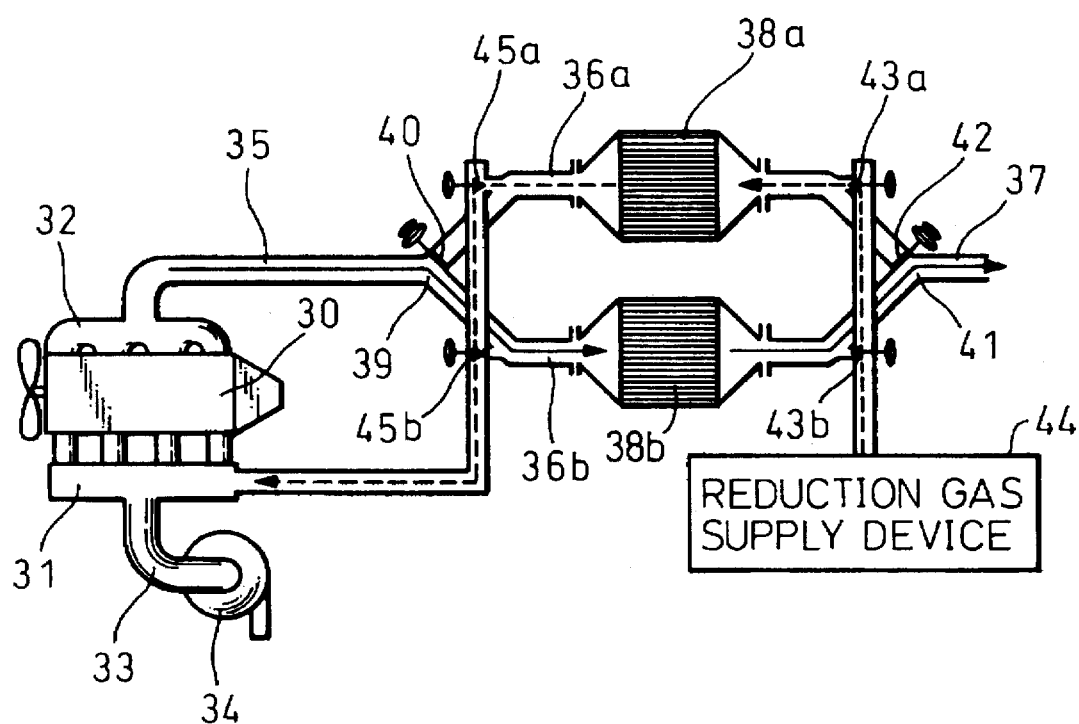
FIG. 19 is an overall view schematically showing still another embodiment of the reciprocating type internal combustion engine.

FIG. 18 and FIG. 19 show a case where the present invention is applied to a reciprocating type internal combustion engine. First of all, referring to FIG. 18, 30 denotes an internal combustion engine body; 31, a surge tank; and 32, an exhaust manifold, respectively. The fuel injection valve 17 is arranged in the intake duct 7 upstream of the heat accumulator 4, and the fuel is injected from the fuel injection nozzle 17 so that the air-fuel ratio of the air-fuel mixture to be supplied into the engine cylinder usually becomes lean. The air-fuel ratio of the air-fuel mixture which is supplied into the engine cylinder is periodically made rich or the stoichiometric air-fuel ratio by increasing the injection amount of fuel from the fuel injection valve 17, and at this time, $NO_x$ is released from the $NO_x$ absorbent of the region 4a carried on the heat accumulator 4.

In the embodiment shown in FIG. 19, the surge tank 31 is connected to the outside air via the intake duct 33 and an air cleaner 34, and the exhaust manifold 32 is connected to an exhaust passageway 35. This exhaust passageway 35 is branched to a pair of exhaust branch passageways 36a and 36b, and these exhaust branch passageways 36a and 36b are combined with a common exhaust passageway 37. In the respective exhaust branch passageways 36a and 36b, fixed type heat accumulators 38a and 38b are respectively arranged. A passageway switching valve 40 is arranged in the branch portion 39 of the respective exhaust branch passageways 36a and 36b, and a passageway switching valve 42 is arranged also in the combined portion 41 of the respective exhaust branch passageways 36a and 36b. On the other hand, the respective exhaust branch passageways 36a and 36b downstream of the respective heat accumulators 38a and 38b are connected to a reduction gas supply device 44 via the corresponding opening or closing valves 43a and 43b, and the respective exhaust branch passageways 36a and 36b upstream of the respective heat accumulators 38a and 38b are connected to the surge tank 31 via the corresponding opening or closing valves 45a and 45b. Note that, also in this embodiment, the $NO_x$ absorbent is carried on the respective heat accumulators 38a and 38b.

The passageway switching valves 40 and 42 are alternately switched to a state where the two end portions of the exhaust branch passageway 36a are closed and a state where the two end portions of the exhaust branch passageway 36b are closed. As shown in FIG. 19 when the two end portions of the exhaust branch passageway 36a are closed by the passageway switching valves 40 and 42, the exhaust gas flows in the heat accumulator 38b as indicated by an arrow of a solid line, and at this time, $NO_x$ in the exhaust gas is absorbed into the $NO_x$ absorbent carried on the heat accumulator 38b. On the other hand, at this time, the opening/closing valves 43a and 45a are opened and the air-fuel mixture of a rich or stoichiometric air-fuel ratio is supplied from the reduction gas supply device 44 to the heat accumulator 38a, whereby this air-fuel mixture is heated by the heat accumulator 38a and, at the same time, $NO_x$ absorbed in the $NO_x$ absorbent carried on the heat accumulator 38a is released. Immediately after this $NO_x$ is released, it is reduced. Subsequently, this gaseous mixture is supplied into the surge tank 31 and mixed with the air taken in from the intake duct 33 and thus the air-fuel mixture which has become lean is supplied into the engine cylinder.

Subsequently, the passageway switching valves 40 and 42 are switched so as to close the two end portions of the exhaust branch passageway 36b. At this time, $NO_x$ in the exhaust gas is absorbed into the $NO_x$ absorbent carried on the heat accumulator 38a. On the other hand, at this time, the opening/closing valves 43a and 45b are opened, and the air-fuel mixture of a rich or stoichiometric air-fuel ratio flows in the heat accumulator 38b. At this time, this air-fuel mixture is heated by the heat accumulator 38b, and simultaneously $NO_x$ absorbed in the $NO_x$ absorbent carried on the heat accumulator 38b is released.

In this way, according to the present invention, provision is made of a heat accumulator through which a supply gas to be supplied into the combustion chamber and an exhaust gas discharged from the combustion chamber are alternately circulated and the $NO_x$ absorbent is carried on this heat accumulator, whereby it is possible to prevent $NO_x$ from being released into the atmosphere while heating the supply gas which is supplied into the combustion chamber.

While the invention has been described by reference to specific embodiments chosen for purposes of illustration, it should be apparent that numerous modifications could be made thereto by those skilled in the art without departing from the basic concept and scope of the invention.

I claim:

1. An exhaust gas purification device comprising:

a combustion chamber;

a heat accumulator through which at least a portion of supply gas fed into the combustion chamber and exhaust gas discharged from the combustion chamber alternately flow, heat being accumulated in the heat accumulator when the exhaust gas flows within the heat accumulator, the supply gas being heated by heat accumulated in the heat accumulator when the supply gas flows within the heat accumulator;

an $NO_x$ absorbent carried on the heat accumulator, the $NO_x$ absorbent absorbing $NO_x$ when an air-fuel ratio of gas contacting the $NO_x$ absorbent is low and releasing an absorbed $NO_x$ when an air-fuel ratio of gas contacting the $NO_x$ absorbent is one of a rich air-fuel ratio and the stoichiometric air-fuel ratio, the $NO_x$ absorbent absorbing $NO_x$ contained in the exhaust gas when the air-fuel ratio of the exhaust gas flowing within the heat accumulator is low; and means for making an air-fuel ratio of the portion of the supply gas flowing into the heat accumulator one of a rich air-fuel ratio and the stoichiometric air-fuel ratio so that $NO_x$ is released from the $NO_x$ absorbent when the air-fuel ratio of the supply gas flowing within the heat accumulator is one of a rich air-fuel ratio and the stoichiometric air-fuel ratio.

2. An exhaust gas purification device as set forth in claim 1, wherein the supply gas of either of a rich air-fuel ratio or a stoichiometric air-fuel ratio is composed of an air-fuel mixture.

3. An exhaust gas purification device as set forth in claim 1, wherein all of the supply gas which is supplied to the combustion chamber is circulated through the heat accumulator.

4. An exhaust gas purification device as set forth in claim 2, wherein a part of the supply gas which is supplied into the combustion chamber is circulated in the heat accumulator, and the remaining supply gas is supplied into the combustion chamber without circulating in the heat accumulator.

5. An exhaust gas purification device as set forth in claim 4, wherein control means is provided for controlling a proportion between said one part of supply gas amount and said remaining supply gas amount.

6. An exhaust gas purification device as set forth in claim 1, wherein the supply gas of either of a rich air-fuel ratio or a stoichiometric air-fuel ratio is composed of an air-fuel mixture containing an exhaust gas.

7. An exhaust gas purification device as set forth in claim 6, wherein control means is provided for controlling a proportion between said exhaust gas amount and said air-fuel mixture amount.

8. An exhaust gas purification device as set forth in claim 6, wherein a gas turbine providing a compressor is driven by the combustion gas in the combustion chamber, and the air-fuel mixture of either of the rich air-fuel ratio or the stoichiometric air-fuel ratio containing the exhaust gas circulates in the heat accumulator and then is fed into the air intake port of the compressor.

9. An exhaust gas purification device as set forth in claim 1, wherein the supply gas of either of the rich air-fuel ratio or stoichiometric air-fuel ratio is composed of the exhaust gas.

10. An exhaust gas purification device as set forth in claim 6, wherein a gas turbine providing a compressor is driven by the combustion gas in the combustion chamber, and the exhaust gas of either of the rich air-fuel ratio or stoichiometric air-fuel ratio circulates in the heat accumulator and then is fed into the air intake port of the compressor.

11. An exhaust gas purification device as set forth in claim 1, wherein the heat accumulator comprises a rotary heat accumulator alternately passing within the circulation path of the supply gas and the circulation path of the exhaust gas.

12. An exhaust gas purification device as set forth in claim 11, wherein the surface area of the heat accumulator in which the supply gas circulates is controlled in accordance with the amount of $NO_x$ absorbed in the $NO_x$ absorbent.

13. An exhaust gas purification device as set forth in claim 11, wherein a plurality of supply gas circulation paths passing in the heat accumulator are provided, and the number of the supply gas circulation paths through which the supply gas of either of the rich air-fuel ratio or stoichiometric air-fuel ratio must be circulated is changed in accordance with the amount of $NO_x$ absorbed in the $NO_x$ absorbent.

14. An exhaust gas purification device as set forth in claim 11, wherein a rotational speed of the heat accumulator is controlled in accordance with an amount of $NO_x$ included in the exhaust gas.

15. An exhaust gas purification device as set forth in claim 11, wherein a plurality of supply gas circulation paths passing in the heat accumulator and a plurality of exhaust gas circulation paths passing in the heat accumulator are provided, and these supply gas circulation paths and exhaust gas circulation paths are alternately arranged along a rotation direction of the heat accumulator.

16. An exhaust gas purification device as set forth in claim 1, wherein the heat accumulator is constituted by a pair of fixed type heat accumulators, the exhaust gas is alternately circulated in a pair of heat accumulators and, at the same time, the supply gas of either of the rich air-fuel ratio or stoichiometric air-fuel ratio is circulated in the heat accumulator in which the exhaust gas does not circulate.

* * * * *